United States Patent [19]
Frantz

[11] Patent Number: 6,003,070
[45] Date of Patent: Dec. 14, 1999

[54] E-MAIL SYSTEM AND INTERFACE FOR EQUIPMENT MONITORING AND CONTROL

[75] Inventor: Robert H. Frantz, Plano, Tex.

[73] Assignee: IntervVoice Limited Partnership, Reno, Nev.

[*] Notice: This patent issued on a continued prosecution application filed under 37 CFR 1.53(d), and is subject to the twenty year patent term provisions of 35 U.S.C. 154(a)(2).

[21] Appl. No.: 08/806,556

[22] Filed: Feb. 25, 1997

[51] Int. Cl.$^6$ .............................. H04L 12/00; G06F 13/00
[52] U.S. Cl. .......................... 709/206; 709/202; 709/203; 709/238; 709/246; 709/250
[58] Field of Search .......................... 395/200.36–200.37, 395/200.74–200.76, 200.3–200.33, 200.72, 200.8; 705/1, 8; 707/10, 104; 709/200–203, 206–207, 227–228, 238, 244–246, 250

[56] References Cited

U.S. PATENT DOCUMENTS

| | | | |
|---|---|---|---|
| 5,406,557 | 4/1995 | Baudoin | 709/206 |
| 5,530,740 | 6/1996 | Irribarren et al. | 709/206 |
| 5,590,281 | 12/1996 | Stevens | 709/246 |
| 5,627,972 | 5/1997 | Shear | 709/246 |
| 5,630,060 | 5/1997 | Tang et al. | 709/206 |
| 5,634,005 | 5/1997 | Matsuo | 709/206 |
| 5,706,452 | 1/1998 | Ivanov | 345/331 |
| 5,765,033 | 6/1998 | Miloslavsky | 759/206 |
| 5,826,269 | 10/1998 | Hussey | 709/206 |

*Primary Examiner*—Zarni Maung
*Assistant Examiner*—Bharat Barot
*Attorney, Agent, or Firm*—Fulbright & Jaworski L.L.P.

[57] ABSTRACT

The invention is an interface device that is either integral or peripheral to equipment that requires monitoring and maintenance. The equipment may be a PBX or ACD, but may also include any type of equipment that requires monitoring and/or maintenance. The interface device converts the output from the equipment to e-mail messages that are sent to the technician at a remote location, and converts e-mail instructions from the technician that are received at the interface device to ASCII terminal keystrokes that the PBX receives and understands. The interface can broadcast multiple error messages to multiple recipients. The interface device allows multiple technicians simultaneous access to the equipment. The interface devices provides enhanced access security to the equipment.

56 Claims, 1 Drawing Sheet

E-MAIL SYSTEM AND INTERFACE FOR EQUIPMENT MONITORING AND CONTROL

TECHNICAL FIELD OF THE INVENTION

This invention relates in general to hardware interfaces and in particular to a smart internet interface for telephone switching equipment status reporting and control.

BACKGROUND OF THE INVENTION

Standard telephone switching equipment like a private branch exchange (PBX) or an automatic call distributor (ACD), typically are equipped with two (2) standard interfaces. One interface would be a standard line printer interface, which is used for the piece of equipment to log error conditions and changes in status and changes in configuration. A second standard interface on most equipment is an ASCII dumb terminal interface to drive a VT 100 style dumb terminal which a technician can use to query an error buffer and also to make changes in the configuration of the system to take on line or off line certain functionalities in the switch.

The main problem with the standard equipment is that all checking and testing must be done locally. In order for a technician to even query an internal buffer or to read the printer output, the technician must physically be present at the same location as the PBX or the ACD. This co-location requirement causes a time problem in that the technicians may be geographically scattered from the equipment that they maintain, and time is lost relocating to the equipment site.

Two known solutions to this problem is to have either an on-site technician permanently assigned to monitor the equipment, or have a visiting technician that makes periodic inspections on a routine basis to check for errors and make configuration changes. The problem with the former solution is that it is expensive to retain personnel for that purpose. The problem with the latter solution is that the technician will most likely be absent when the equipment suffers a breakdown or other serious problem. Another drawback to the latter solution is that the technician may be busy or otherwise involved at another equipment site, and thus, unable to respond to the equipment problem.

Some PBXs or ACDs may be equipped with another type of interface. This interface is a link to the telephone system through a single modem. Current technology usually has only one telephone line for remote maintenance. So, if one technician is already connected to the equipment or PBX through that on e single modem, a second technician that needs to perform a different operation, perhaps a software upgrade or a reconfiguration of resource, cannot access the PBX until the first technician is done. Moreover, this type of telephone interface is 'passive' in that it does not seek out the technician when a problem arises, but rather waits until the technician dials into the equipment.

A major problem in the current technology with using the telephone interface is the lack of security. As the telephone interface is passive, it does not perform any kind of caller authentication or security screening on incoming calls. Thus, individuals known as 'hackers' take advantage of this weakness in the system and break into the PBX system. Once inside, the hackers may change codes in the switching PBX, thus allowing them to make illegal long distance phone calls. Even worse, the hackers may attempt to sabotage the system by inserting a virus or deleting important system files.

SUMMARY OF THE INVENTION

The above, and other needs, are met by the use of the inventive intelligent interface. The invention allows a technician to remotely query the PBX or ACD, as if the technician is using the co-located ASCII dumb terminal that is located at the same place as the ACD or the PBX. Moreover, the invention allows the technician to perform this function via the internet. Thus, the technician can, at any place that allows for an internet connection, read what would be outputted on the printer at the PBX. The technician can send commands to the equipment and receive responses from the equipment as if the technician were at the local ASCII terminal.

Application Ser. No. 08/805,289, filed concurrently herewith, having a common assignee, entitled E-MAIL REPORTING USING MESSAGE FILTERING, by Robert H. Frantz, is hereby incorporated by reference herein.

The invention is an interface device, which could be integral or attached to the equipment. The equipment may be a PBX or ACD, but may also include any type of equipment that requires monitoring and/or maintenance. These types of equipment may include, but are not limited by, the following: other telecommunications apparatus, a security/alarm system, a safety system that monitors detectors for fire, carbon monoxide, radon, poison gases, and/or water leakage, a vending machine that monitors the number of products and their expiration dates, a photocopier that monitors the amount of toner and paper, a home-type appliance such as a refrigerator or washing machine, a weather alert system, a lighting system, a computer, a printer, a vehicle, a personal monitoring system that monitors the health and/or location of a person and a building environmental control system.

The inventive interface could emulate a printer interface and/or an ASCII dumb terminal interface to the PBX. The interface would include an internet e-mail messaging capability that is connected to the public telephone network via an analog or a digital telephone line. By using a series of interactions of sending and receiving e-mails, the inventive interface device allows for communication between the PBX equipment and the remotely located technician.

The interface device converts the output from the PBX equipment to e-mail messages that are sent to the technician at a remote location, and converts e-mail instructions from the technician that are received at the interface device to ASCII dumb terminal keystrokes that the PBX would receive and understand.

The inventive interface also could convert video output from the ASCII terminal at the PBX location into e-mail information that is directed to the remote technicians. Thus, the remotely situated technician could see the same information that would be displayed on the local ASCII terminal.

The interface has a database with profile information about the recipient and includes custom selected activation criteria for designating critical E-mail. The E-mail generator establishes communication with the recipient in accordance with the profile information. The interface also has a database controller that alters the data stored in the database, particularly the profile information and the activation criteria. The interface may also be equipped with a text-to-speech converter that allows the recipient to receive the critical E-mail via direct telephone link (not shown).

A benefit of the invention is that a technician does not have to visit the physical site to query the machine. Thus, the technician can instigate self-test remotely. The technician can remotely view the results of a self-test. The technician can remotely view the contents of the error buffer, as well as the output from the printer. If the technician is located at a warehouse, or other central facility, then the technician may be able to determine what spare parts are needed to repair the equipment, and take these parts to the equipment site, rather than requiring two visits, i.e. one to determine what spare parts are necessary and one to return with the spare parts. This would also relieve the need for the technician to have a large truck, equipped with many spare parts. Thus, the technician does not have to make routine site visits, i.e. the technician would not have to visit the site until there is an actual problem.

A technical advantage of the present invention is to allow remote query and maintenance of the equipment. The invention may either be peripheral or integral with the monitored equipment. It allows maintenance personnel to query the equipment from a remote location, run/execute tests, view the results of the tests, empty the error buffer to view past problem occurrences over time, and perform other functions to try to correct and repair the equipment. The invention also allows routine maintenance type function to be remotely performed such as changing the configuration or enabling/disabling certain functionalities of the equipment.

Another technical advantage of the present invention is to send more than one message in response to the receipt of an error. Rather than sending one error message to one recipient, the invention can broadcast multiple error messages to multiple recipients. This increases the possibility of delivering the message to an available technician that can respond to the problem.

A further technical advantage of the present invention is to allow multiple users, or multiple technicians to be querying the machine and sending commands to the equipment simultaneously. With the inventive e-mail interface and an enhancement to the e-mail interpreter and generator function, multiple technicians could be allowed simultaneous access to the equipment, so that one technician doing a remote self-test and looking for failed hardware could be accessing the system at the same time as another technician that is upgrading portions of software for switching functionality or voice mail functionality, for example.

A further technical advantage of the present invention is to provide enhanced security to access the system. The inventive interface will allow for various levels of security, via encryption and authentication techniques, so that different technicians are allowed to perform different functions. This provides increased security by restricting the number of callers that can access the system and perform certain functions. Moreover, the invention can provide an alarm function by sending out e-mail messages alerting the appropriate personnel of unauthorized access attempts, and disable or otherwise ignore subsequent access requests from the unauthorized individual.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
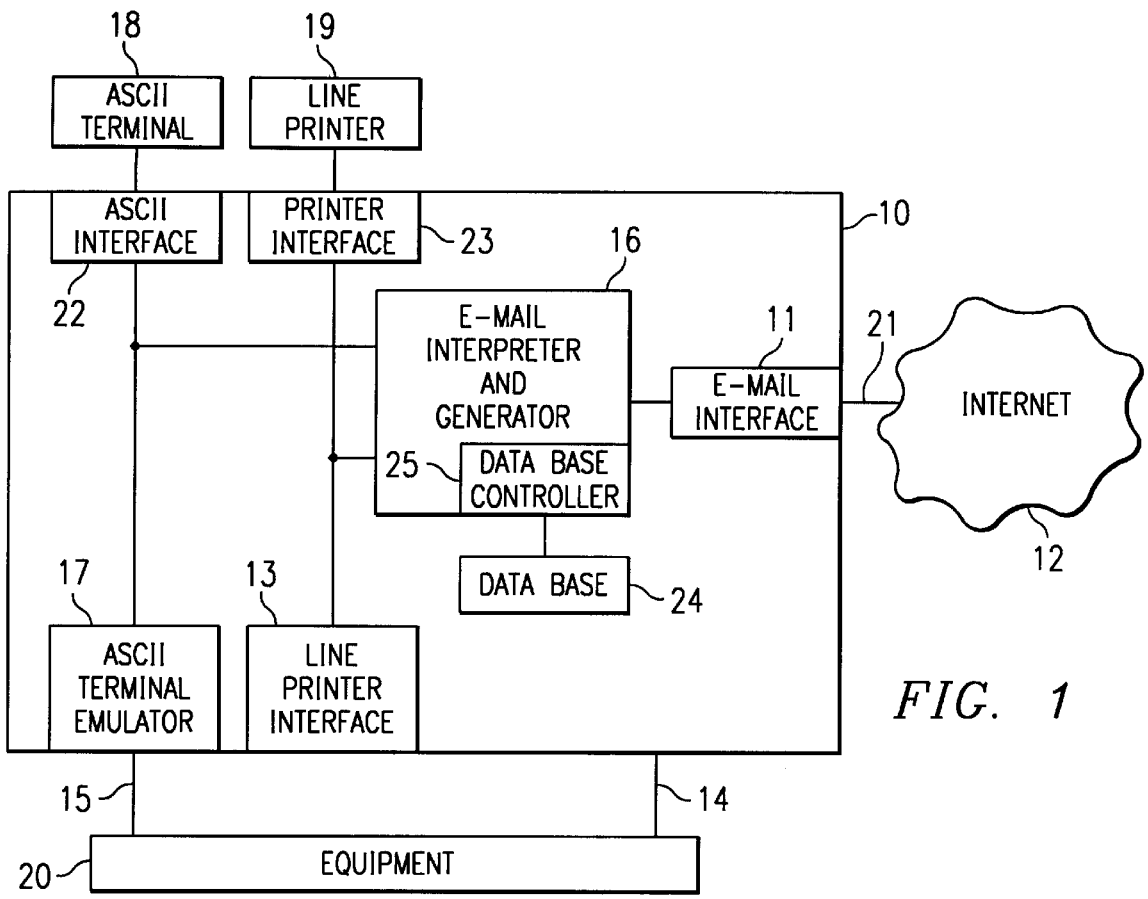
FIG. 1 is a schematic diagram of the inventive interface peripheral to the equipment being monitored.

FIG. 1 shows the invention as an external device to an existing PBX or ACD or some other piece of equipment that needs to be monitored and maintained. The inventive interface device 10 is placed between the equipment 20, and the ASCII terminal 18 and the line printer 19. The device 10 is inserted into the communication lines 14, 15 running between the equipment 20 to the terminal and printer 19. The interface device 10 has two interfaces to the PBX, a line printer interface 13 which emulates a line printer to the PBX, and an ASCII terminal emulator 17 which emulates an ASCII terminal to the PBX and is able to send character keystrokes to the PBX and to receive screen information from the PBX.

The ASCII terminal emulator 17 and the line printer interface 13 are used in this case because these devices are typically used with PBX systems. The ASCII terminal emulator 17 and the line printer interface 13 could be substituted with other emulators and interfaces to satisfy the I/O requirements of the equipment 20 being monitored. This statement also applies to the ASCII interface 22 and the printer interface 23.

Also included in the interface device 10 is an e-mail interface 11, which connects the device 10 to the internet 12 using E-mail link 21. The e-mail interface 11 is capable of sending and receiving standard e-mail messages used on the internet. The interface device 10 uses an e-mail interpreter and generator 16. The interpreter 16 allows information that is received at either the ASCII terminal emulator 17 or the line printer interface 13 to be converted into an e-mail message sent to the e-mail interface 11 and is directed towards a particular internet address, which would be the technician located somewhere on the internet 12.

Similarly, the interpreter converts e-mail from the technician into data usable by the equipment. The e-mail from the technician could be system commands, requests for information, upgrade instructions, and other data used to repair, maintain, monitor, or upgrade the system. The commands or other data sent by the technician would be presented to the equipment via the ASCII terminal emulator 17, thus, the equipment responds as if the commands were entered on site at the ASCII terminal 18.

The E-mail message may be sent directly to a specific recipient or the message may be sent to an E-mail server (not shown), which would then forward the message to the recipient or select a recipient to respond to the message.

The E-mail interpreter and generator 16 receives the system messages, including error messages, from the equipment 20. If the system messages contains any of the activation criteria stored in the database 24, the E-mail interpreter and generator queries the database for each intended recipient's profile which is also stored in the database 24. The E-mail generator 16 then sends to each of the recipients an E-mail message containing the details of the system message. The database controller 25 allows technicians to update their profiles in the database 24, placing themselves on duty, taking themselves off duty, revising the current supervisory or backup personnel, change their E-mail addresses or other notification criteria, as well as change the activation criteria.

Specifically, the activation criteria can be set to an alert mode, wherein only emergency system messages, such as critical error messages would be sent. The activation criteria can be set to a maintenance/repair mode where every system message, including interrupts, register contents, memory mapping, memory contents, software descriptions, configuration settings, error log contents, and any other data useful information about the status of the equipment that would be used by a technician in repairing, updating, monitoring, or performing routine maintenance on the equipment is sent via E-mail.

Also on the interface device 10 would be an ASCII terminal interface 22 which would allow information received at the ASCII terminal emulator 17 from the equipment 20 to be passed through to the terminal 18. Similarly, the interface device would have a printer interface 23 that would allow information received at the line printer interface 13 to be passed through to the printer 19. If a technician entered commands on the ASCII terminal 18, the data would be passed through the interface device 10 via the ASCII interface 22 to the ASCII terminal emulator 17 and onto the equipment 20. This would allow normal operation at the equipment site of the existing ASCII terminal 18 and printer 19 with enhanced operation of the internet interface. The interpreter could also be configured to pass command entered on the terminal 18 across the internet 12. The interface 10 could use the printer 19 to print its own history log and other information in addition to printing information sent by the equipment.

The e-mail interpreter 16 would further have functionality that allows multiple internet addresses to be addressed in special cases, such as critical errors that are logged to the printer 19. These errors will be noticed by the e-mail interpreter 16 via the line printer interface 13. Operating in a broadcast mode, the e-mail interpreter 16 would mail multiple messages to multiple internet addresses 12 in an attempt to get attention immediately.

The preferred embodiment of the peripheral interface device 10 is a general purpose or personal computer. The computer needs to be equipped with four (4) serial ports. The first serial port would be the ASCII terminal connection that would be were the ASCII terminal emulator 17 that communicates to the equipment 20. The second serial port would be the ASCII interface 22 which allows the interface 10 to pass commands and data to/from the ASCII terminal 18 and screen displays from the equipment 20 to the ASCII terminal 18. The third serial port is the line printer interface 13, that would allow the device 10 to connect to the printer output line from the equipment 20. This may be substituted with a parallel port if the equipment is able to drive a printer with a parallel interface rather than a serial or RS 232 port. The fourth serial port is the printer interface 23 that connects the device 10 to the line printer 19.

The e-mail interface 11 would preferable be a 28.8 kilobyte modem, or possibly an ISDN rated modem. Currently, the most used interface to the internet is a telephone line running a 28.8 kb modem. Either an internal modem installed in the PC or an external modem connected to a fifth serial port of the PC may be used. The preferred embodiment also uses a software program to perform the e-mail interpreter and generator functions, the e-mail interface functions, a line and printer interface function, and the ASCII terminal emulator functions.

Figure 2:
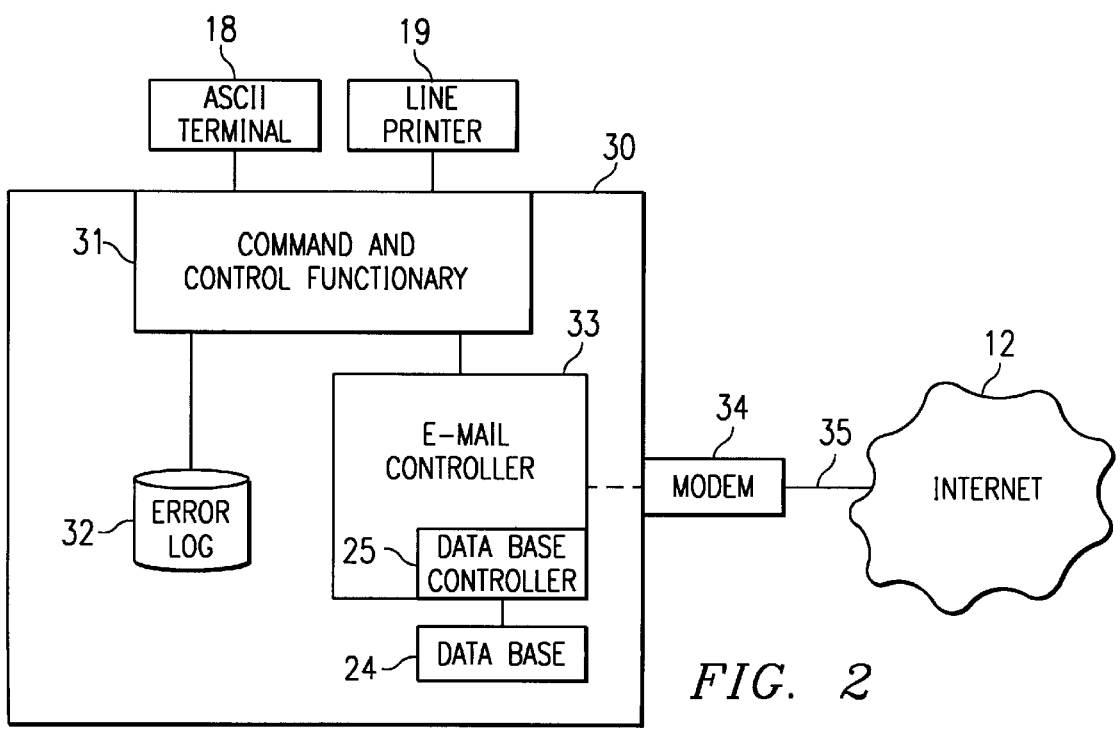
FIG. 2 is a schematic diagram of the inventive interface integral to the equipment being monitored.

FIG. 2 shows an alternative embodiment where the e-mail interface functionality is integral to the equipment 30. Typically, a PBX or an ACD has an internal error log 32 and an internal command and control functionality 31. Normally, the command and control functionality 31 would interface to a ASCII terminal 18. The error log 32, through command and control functionality 31, would interface to the line printer 19. The invention would be to include an e-mail controller 33, either in hardware and/or software, with the equipment 30. The controller 33 receives information from the error log 32 via the functionality 31, and can receive and send information to the command and control functionality 31.

The e-mail controller 33 would also interface to either an internal or external modem device 34 which then could be connected directly to the internet 12 using modem link 35. This would allow the e-mail controller 33 to perform the same functionality as shown in the e-mail interpreter and generator 16 in FIG. 1, specifically monitoring for critical errors from the error log 32 and emulating command and control actions to the command and control functionality 31 of the equipment 30 via e-mail messages in the same manner as that of the external embodiment shown in FIG. 1.

The e-mail controller 33 would essentially be a card installed in the equipment system 30. The card would be compatible with the standards of the PBX, ACD or other equipment that is to be monitored. The card would include a microprocessor and software to perform the e-mail interpreting and generation functions, these function could be embedded into ROM or stored on a disk for easier updating. The card would need to be designed to conform to mechanical and electrical standards used by the equipment manufacturer.

Although the present invention and its advantages have been described in detail, it should be understood that various changes, substitutions and alterations can be made herein without departing from the spirit and scope of the invention as defined by the appended claims.

What is claimed is:

1. An electronic mail system that uses a global network to communicate an equipment originated message from equipment via e-mail to a recipient and to communicate an equipment destined e-mail message to the equipment, thereby enabling bidirectional communication between the equipment and a remote recipient to allow maintenance to be performed remotely for the equipment, the system comprising:

equipment located at an equipment site;

an e-mail link connecting the equipment site to the global network that is capable of sending at least one outgoing e-mail message to the recipient across the global network and that is capable of receiving at least one equipment destined e-mail message from the recipient across the global network; and an e-mail interpreter, connected between the equipment and the e-mail link, for receiving at least one equipment originated message from the equipment and converting said at least one equipment originated message into said at least one outgoing e-mail message, and converting said at least one equipment destined e-mail message into at least one incoming equipment message and sending said at least one incoming equipment message to the equipment.

2. The system of claim 1, wherein the e-mail interpreter further comprises:

a database having profile information about the recipient and activation criteria;

wherein the e-mail interpreter addresses said at least one outgoing e-mail message to the recipient in accordance with the profile information.

3. The system of claim 2, wherein the e-mail interpreter determines whether to convert said at least one equipment originated message into said at least one outgoing e-mail message in accordance with the activation criteria.

4. The system of claim 3, wherein the e-mail interpreter converts all equipment originated messages into said at least one outgoing e-mail message when the activation criteria is set to a repair mode.

5. The system of claim 3, wherein the e-mail interpreter converts only emergency equipment originated messages into said at least one outgoing e-mail message when the activation criteria is set to an alert mode.

6. The system of claim 2, wherein the e-mail interpreter determines whether to send said at least one outgoing e-mail message to the recipient in accordance with the activation criteria.

7. The system of claim 6, wherein the e-mail interpreter determines to send all outgoing e-mail messages to the recipient when the activation criteria is set to a repair mode.

8. The system of claim 6, wherein the e-mail interpreter determines to send only emergency outgoing e-mail messages to the recipient when the activation criteria is set to an alert mode.

9. The system of claim 2, wherein the e-mail interpreter further comprises:
a database controller for altering both the profile information and the activation criteria.

10. The system of claim 2, wherein said e-mail interpreter can determine to send said at least one outgoing e-mail message to multiple recipients in accordance with the profile information.

11. The system of claim 1, wherein the e-mail interpreter is integral with the equipment.

12. The system of claim 1, wherein the e-mail interpreter is peripherally located to the equipment.

13. The system of claim 1, further comprising:
a ASCII terminal for issuing commands to the equipment; and
a line printer for at least recording information concerning the equipment;
wherein the e-mail interpreter is connected between each of the ASCII terminal, the line printer, and the equipment.

14. The system of claim 13, wherein:
said at least one e-mail interpreter receives the equipment originated message that the equipment is sending to either the ASCII terminal or the line printer and converts the equipment originated message into said at least one outgoing e-mail message; and
the e-mail interpreter receives a command e-mail message from the recipient and converts the command e-mail message into an equipment command message, wherein the equipment responds to the equipment command message as if the equipment command message was inputted on the ASCII terminal.

15. The system of claim 14, wherein:
the e-mail interpreter passes the equipment originated message to either the ASCII terminal or the line printer.

16. The system of claim 1, wherein the equipment is selected from the group consisting of:
a PBX system, an ACD, other telecommunications equipment, a security system, a safety system, a vending machine, a photocopier, a home-type appliance, a weather alert system, a lighting system, a computer, a printer, a vehicle, personal monitoring system, a building environmental control system, and any combination thereof.

17. The system of claim 1, wherein said at least one equipment originated message is selected from the group consisting of:
a system message, an error message, an interrupt, register content, memory mapping, memory content, software description, configuration setting, error log content, and any combination thereof.

18. The system of claim 1, wherein said at least one incoming equipment message is selected from the group consisting of:
system command, request for information, upgrade instruction, and any combination thereof.

19. The system of claim 1, wherein the equipment destined and outgoing e-mail messages include textual information.

20. The system of claim 1, wherein the equipment has a primary function, and the equipment destined and outgoing e-mail messages include communication which is separate and independent from the primary function of the equipment.

21. The system of claim 1, wherein the e-mail link allows multiple of the recipients simultaneous communication access to the equipment.

22. The system of claim 1, further comprising:
an e-mail generator that sends said at least one outgoing e-mail message to the recipient.

23. The system of claim 1, wherein said maintenance comprises querying, monitoring, repairing, upgrading, and other functions to be performed for the equipment.

24. The system of claim 1, wherein said at least one equipment originated message originates in response to communication from the recipient.

25. The system of claim 1, wherein said at least one equipment originated message originates independent of communication from the recipient.

26. An electronic mail interface for connecting equipment to an e-mail system that sends and receives messages between the equipment and a recipient, wherein such communication allows for maintenance to be performed remotely for the equipment, the interface comprising:
a database having profile information about the recipient;
means for interpreting an equipment originated message and converting the equipment originated message into an outgoing e-mail message;
means for sending the outgoing e-mail message to the recipient in accordance with the profile information;
means for receiving an incoming e-mail message from the recipient; and
means for interpreting the incoming e-mail message and converting the incoming e-mail message into an incoming equipment message that is presented to the equipment.

27. The interface of claim 26, wherein the database stores activation criteria and wherein the means for interpreting an equipment originated message determines whether to convert the equipment originated message into an outgoing e-mail message in accordance with the activation criteria.

28. The interface of claim 27, wherein the means for interpreting an equipment originated message converts all equipment originated messages into an outgoing e-mail message when the activation criteria is set to a repair mode.

29. The interface of claim 27, wherein the means for interpreting an equipment originated message converts only emergency equipment originated messages when the activation criteria is set to an alert mode.

30. The interface of claim 26, wherein the database stores activation criteria and wherein the means for interpreting an equipment originated message determines whether to send the outgoing e-mail message to the recipient in accordance with the activation criteria.

31. The interface of claim 30, wherein the means for interpreting an equipment originated message determines to send all outgoing e-mail messages to the recipient when the activation criteria is set to a repair mode.

32. The interface of claim 30, wherein the means for interpreting an equipment originated message determines to send only emergency outgoing e-mail messages to the recipient when the activation criteria is set to an alert mode.

33. The interface of claim 27, further comprising:
a database controller for altering both the profile information and the activation criteria.

34. The interface of claim 26, wherein the e-mail interface is integral with the equipment.

35. The interface of claim 26, wherein the e-mail interface is peripherally located to the equipment.

36. The interface of claim 26, wherein the equipment is a PBX system.

37. The interface of claim 26, wherein the equipment is at least one of the following:
an ACD, other telecommunications equipment, a security system, a safety system, a vending machine, a photocopier, a home-type appliance, a weather alert system, a lighting system, a computer, a printer, a vehicle, personal monitoring system, and a building environmental control system.

38. The interface of claim 26, wherein the incoming and outgoing e-mail messages include textual information.

39. The interface of claim 26, wherein the equipment has a primary function, and the incoming and outgoing e-mail messages include communication which is separate and independent from the primary function of the equipment.

40. The interface of claim 26, wherein multiple of said recipients are allowed simultaneous communication access to the equipment.

41. The interface of claim 26, wherein said means for sending the outgoing e-mail message to the recipient in accordance with the profile information can send said outgoing e-mail message to multiple recipients in accordance with said profile information.

42. The interface of claim 26, wherein said means for interpreting an equipment originated message and said means for interpreting the incoming e-mail message and converting the incoming e-mail message are an e-mail interpreter.

43. The interface of claim 26, wherein said maintenance comprises querying, monitoring, repairing, upgrading, and other functions to be performed for said equipment.

44. The interface of claim 26, wherein said equipment originated message originates in response to communication from said recipient.

45. The interface of claim 26, wherein said equipment originated message originates independent of communication from said recipient.

46. A method of performing bidirectional communication between equipment and a remote technician to enable remote maintenance for the equipment, the method comprising:

receiving at least one equipment originated message from the equipment;

converting said at least one equipment originated message into at least one outgoing e-mail message;

sending said at least one outgoing e-mail message across a global network to at least one technician;

receiving at least one equipment destined e-mail message from said at least one technician across a global network;

converting said at least one equipment destined e-mail message into at least one equipment command message; and sending said at least one equipment command message to the equipment.

47. The method of claim 46, wherein said equipment is selected from the group consisting of:
a PBX system, an ACD, other telecommunications equipment, a security system, a safety system, a vending machine, a photocopier, a home-type appliance, a weather alert system, a lighting system, a computer, a printer, a vehicle, personal monitoring system, a building environmental control system, and any combination thereof.

48. The method of claim 46, wherein said equipment originated message is selected from the group consisting of:
an error message, an interrupt, register content, memory mapping, memory content, software description, configuration setting, error log content, and any combination thereof.

49. The method of claim 46, wherein said equipment command message is selected from the group consisting of:
system command, request for information, upgrade instruction, and any combination thereof.

50. The method of claim 46, wherein said equipment has a primary function, and the equipment destined and outgoing e-mail messages include communication which is separate and independent from the primary function of the equipment.

51. The method of claim 46, wherein said converting said at least one equipment originated message into said at least one outgoing e-mail message is performed in accordance with a predefined activation criteria.

52. The method of claim 46, wherein said sending said at least one outgoing e-mail message is performed in accordance with profile information about the technician.

53. The method of claim 52, wherein said sending said at least one outgoing e-mail message is performed in accordance with a predefined activation criteria.

54. The method of claim 46, wherein said maintenance comprises querying, monitoring, repairing, upgrading, and other functions to be performed for said equipment.

55. The method of claim 46, wherein said equipment originated message originates in response to communication from said technician.

56. The method of claim 46, wherein said equipment originated message originates independent of communication from said technician.

* * * * *